W. C. McADAMS.
BOLL WEEVIL CATCHER AND DESTROYER.
APPLICATION FILED MAY 3, 1916.
1,224,555.
Patented May 1, 1917.
2 SHEETS—SHEET 1.
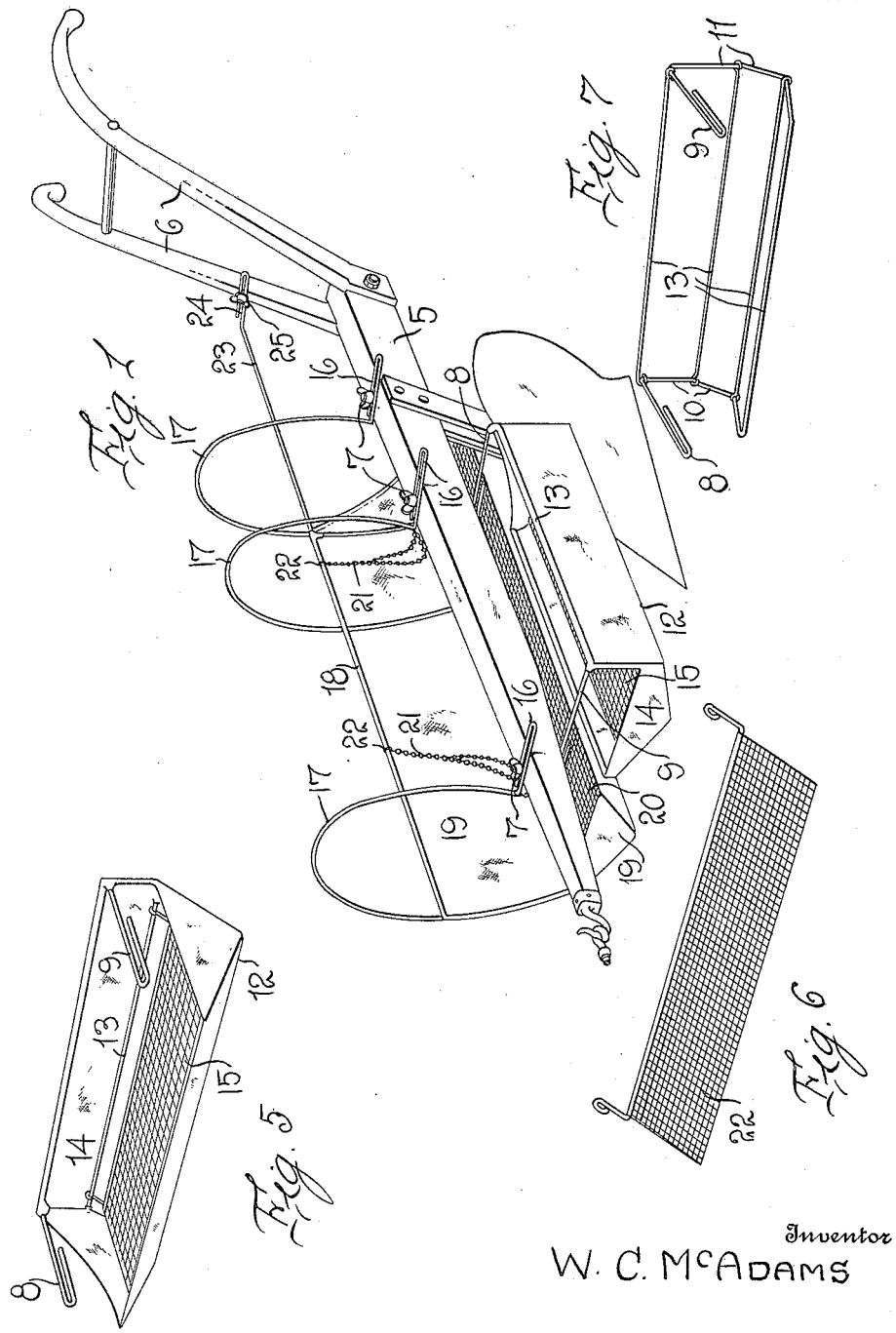
Inventor
W. C. McADAMS
By Watson E. Coleman
Attorney

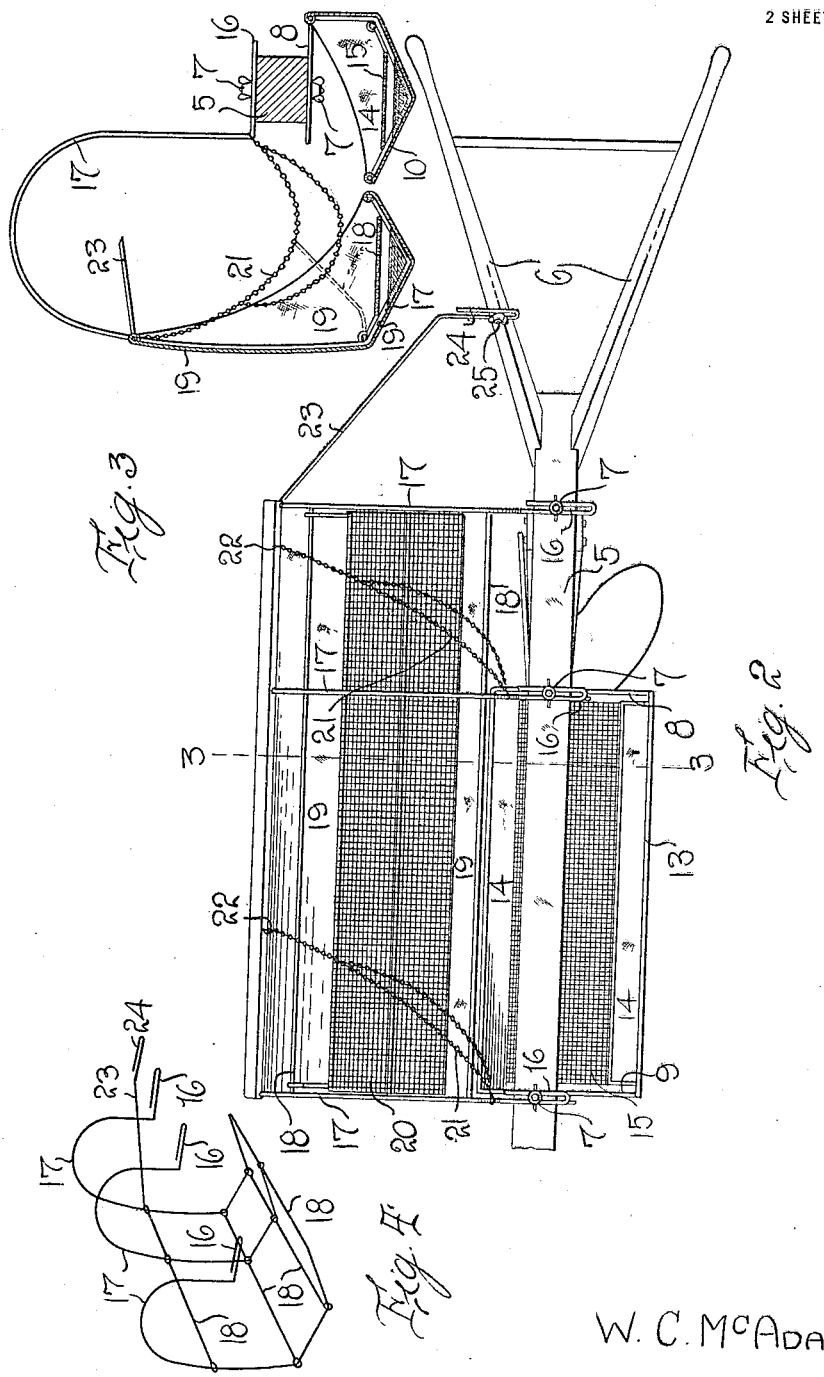

UNITED STATES PATENT OFFICE.

WILLIAM C. McADAMS, OF MILLPORT, ALABAMA, ASSIGNOR OF ONE-HALF TO WILL B. LACY, OF COLUMBUS, MISSISSIPPI.

BOLL-WEEVIL CATCHER AND DESTROYER.

1,224,555.  Specification of Letters Patent.  Patented May 1, 1917.

Application filed May 3, 1916. Serial No. 95,171.

*To all whom it may concern:*

Be it known that I, WILLIAM C. McADAMS, a citizen of the United States, residing at Millport, in the county of Lamar and State of Alabama, have invented certain new and useful Improvements in Boll-Weevil Catchers and Destroyers, of which the following is a specification, reference being had to the accompanying drawings.

This invention is a boll weevil catcher and destroyer.

In most of the devices used for this purpose, the bolls are clipped off and they may or may not fall into suitable troughs, as these troughs are usually so positioned that there is no absolute surety of their catching and receiving such bolls.

One object of this invention is to provide a cheap and easily constructed machine of few parts and one that may be readily cleaned.

Another object of this invention is to provide a machine wherein the bolls containing the weevil are thoroughly agitated and are caused to fall on to the foraminous tray and then dropping to the bottom of the trough to be caught.

A further object is to provide a machine in which the troughs are carried by yieldable supports that are adjustably mounted on the plow.

A still further object is to provide a machine in which the troughs may be positioned angularly with reference to each other.

One purpose of the invention is to provide a machine in which the knocker or agitator elements may be freely and loosely suspended, said elements being adapted to swing over and engage with the cotton stalks and thus effectually agitate the same to knock out the boll weevil.

The invention broadly stated comprises a plow, a plurality of troughs angularly positioned with reference to each other and in abutting engagement, a plurality of yieldable supports for the troughs adjustably mounted on the plow, said troughs being provided with foraminous trays, a plurality of freely and loosely suspended yieldable knocker or agitator elements positioned angularly relative to the abutting portions of the troughs, so that when the cotton or other plant stalks pass between the troughs, the knocker or agitator elements engage with and agitate the stalks sufficiently to knock off insects.

A practical form of the invention is shown in the accompanying drawings, in which Figure 1 is a perspective view;
Fig. 2 is a top plan view;
Fig. 3 is a vertical part section on the line 3—3 of Fig. 2;
Fig. 4 is a diagrammatic view of the method of forming one of the troughs;
Fig. 5 is a perspective view of the trough 12;
Fig. 6 is a perspective of one of the foraminous trays; and
Fig. 7 is a perspective of the framework of trough 12.

To carry the various troughs and several supporting elements, a plow is provided having a beam 5. This plow is provided with the usual handles 6. Spaced longitudinally of the beam 5 are suitable apertures through which pass some convenient locking means indicated by the numeral 7. These locking means are shown as being of the ordinary type of bolt.

Coöperating with certain of the locking means are slotted elements 8 and 9 which connect with yieldable supports 10 and 11 which support the trough 12 beneath the plow beam. These yieldable supports are so formed that the trough is shown as being triangular in section. To space the ends of the trough apart, suitable spacing elements or rods 13 are provided, one of these spacing elements being connected across the slotted elements 8 and 9 and the others disposed upon the supports 10 and 11 so as to form the trough in its lower portion so that it will be triangular in cross section.

The yieldable supports 10 and 11 and by means of certain of the spacing elements 13 provide a frame-work on which is fastened a suitable covering material 14 which preferably begins with the upper spacing member and passes downward and around to the free edge of the trough. The troughs being triangular in cross section and their apices being downwardly projected, their bases lie in a substantially horizontal plane and the free edge of one of the troughs is substantially parallel to the other edge which is formed by the juncture of the back with one of the sides of the triangle. Thus this trough in its general configuration, as shown more particularly in Fig. 5, is prismatic.

This covering material at the rear end provides an effectual barrier to prevent the bolls and the weevils from passing rearward. Disposed within the trough 12 is a foraminous tray 15 which is preferably hinged to one of the spacing members.

Adjustably engaging with the locking means 7 on the top side of the plow beam 5 are other slotted elements 16 and these slotted elements are connected to the yieldable supports 17 which carry another trough. These yieldable supports are continued so as to form a trough which is triangular in cross section. These supports 17 connected with the slotted elements 16 extend preferably upward and outward and thereby form curved portions which provide a yieldable and resilient support between the slotted elements and the trough. This trough is provided with suitable spacing elements 18 and thus provides a framework over which a suitable covering material 19 is stretched.

Disposed within this latter trough is a foraminous tray 20 which is preferably hinged to one of the spacing elements. In order to catch the weevils and to hold them until the proper time can be had for their absolute destruction, the bottom of each of the troughs may be filled with some sticky substance such as coal tar or pine tar.

Secured to the supports 17 are the knocker or agitator elements 21. The other ends of these knocker elements are provided with a suitable fastening means such as is shown by means of the hooks 22 which are adapted to be positioned at various points upon one of the spacing elements 18. These knocker elements 21 are shown as being composed of a light chain, which is loosely and freely suspended so that it will have a curve downward between the supports and the spacing elements, thus adapting it to engage with the upper portion of the cotton stalk, as it passes between the troughs.

By means of the slotted elements 8 and 9 and 16, the troughs may be placed in abutting engagement or spaced from each other and when placed in abutting engagement, they may also be angularly positioned to each other. Connected to the rear support 17 is another spacing element 23 which is provided with a slotted portion 24 to engage with suitable means such as is shown by the screw 25 positioned on one of the handles 6.

It is to be noted that the members 17 are made of resilient material and, therefore, that the free ends of these members may yield laterally or that the members will resiliently yield in a vertical direction. Furthermore it is to be noted that the members 8 which support the trough 12 are adapted to resiliently yield vertically. Thus the two troughs while normally held in a parallel relation and in the same plane are adapted to yield independently of each other, both laterally and horizontally relatively to each other so as to permit the troughs to move over the ground and conform more or less to the inequalities of the same. Furthermore it is to be noted with my construction if it be used upon a side hill that the troughs may be so adjusted as to receive the plants between them even though the beam 5 is laterally inclined to a horizontal and that the contact of the troughs with the ground will flex the resilient elements 17 and 8 and 9 to such an extent as to cause the troughs to conform to the laterally inclined ground over which the plow is traveling.

In practical operation the troughs are adjusted so as to be in abutting engagement and the knocker chains are so disposed that they will lie more particularly over the line of the abutting engagement so that when the stalks pass between the two troughs, the upper portions of the stalks will be thoroughly agitated by means of these knocker or agitator chains and the bolls and boll weevils will be thrown into one or the other of the troughs on to the trays. The trays being foraminous, are adapted to screen the boll weevils from the material and thus permit the boll weevil to pass into the bottom of the trough and be securely held or caught by such sticky substance as may be placed therein. By providing light chains to agitate the tops of the stalks, they will more thoroughly agitate as the chains are more or less yieldable than the usual stiff rods which are operated by springs.

Minor changes in form and details of construction may be resorted to without departing from the spirit of my invention or the scope of the appended claims.

Having described this invention, what is claimed is:—

1. The combination with a supporting member, of a boll weevil catcher and destroyer comprising oppositely disposed parallel troughs and resilient supports extending upward from each trough and each adjustably engaging said supporting member whereby to permit the troughs to be shifted toward or from each other, said resilient supports yieldingly holding the troughs in parallel relation and in the same plane and being sufficiently yieldable to permit plant stalks to pass between the confronting edges of the troughs.

2. An insect catching attachment for plows comprising a trough having inwardly turned arms adapted to engage with a plow beam to support the trough below the beam, and a coacting trough having on its outer edge upwardly and then downwardly extending arms independent of the arms on the first named trough formed to engage the plow beam.

3. An insect catching attachment for plows comprising a trough adapted to be mounted upon a plow beam and below the same, and an oppositely disposed trough having a plurality of upwardly extending and then downwardly extending resilient arms adapted to be operatively engaged with the plow beam and laterally adjustable thereon independent of the first named trough.

4. An insect catching attachment for plows comprising a trough having slotted arms for engagement with a plow beam, and a coacting trough having arms extending upward, inward and downward, said arms being resilient and being angularly bent at their extremities and formed with slots whereby they may be adjustably engaged with a plow beam.

5. An insect catching attachment for plows comprising a trough having an upwardly extending outer wall and a plurality of inwardly extending resilient arms on said wall, the arms being longitudinally slotted whereby they may be engaged with a plow beam, and a coacting trough having a plurality of resilient arms extending from its outer edge, the arms extending upward then inward and downward, the extremities of the arms being angularly bent and longitudinally slotted, and a connecting member attached to said arms and extending longitudinally and formed at its extremity with an angularly bent longitudinally slotted rod for engagement with a plow handle.

In testimony whereof I hereunto affix my signature in the presence of two witnesses.

WILLIAM C. McADAMS.

Witnesses:
R. V. WINDHAM,
H. L. MAYERS.

Copies of this patent may be obtained for five cents each, by addressing the "Commissioner of Patents, Washington, D. C."